July 21, 1953    P. J. HERBST    2,645,971
SURFACE CONTOUR MEASUREMENT
Filed June 28, 1949

INVENTOR
Philip J. Herbst
BY
ATTORNEY

Patented July 21, 1953

2,645,971

UNITED STATES PATENT OFFICE 2,645,971

SURFACE CONTOUR MEASUREMENT

Philip J. Herbst, Moorestown, N. J., assignor to Radio Corporation of America, a corporation of Delaware Application June 28, 1949, Serial No. 101,816

10 Claims. (Cl. 88—14)

This invention relates to improvements in the art of examining the surface of an object, and particularly to an improved method of and apparatus for obtaining an accurate measurement of surface contours or profiles.

Various methods have been proposed for obtaining an accurate indication of the surface contours of both uniform and irregularly shaped objects to determine whether or not the contours of the object surface conform to a reference pattern, or to determine whether or not the dimensions of the object being examined come within permissible tolerances. For example, it is common practice to caliper die models and the like to check the shape and measurements thereof for conformance with a pattern. Prior art methods of making such examinations are generally laborious and time consuming, require considerable manipulative or interpretive skill, and are not always as accurate as might be desired.

It is, accordingly, a principal object of the present invention to provide an improved method of and apparatus for simple and accurate measurement of the surface contours of an object.

Another object of the invention is to provide for surface contour measurement without physical contact between the measuring device and the surface being examined.

A further object of the invention is the provision of surface contour measuring apparatus which will present an accurate picture of surface contours along a selected section through the object being examined.

Another object of the invention is to provide an improved method of and apparatus for checking thickness dimensions of an object.

According to the invention, the foregoing and other objects and advantages are attained by immersing the object to be examined in a bath of liquid having known light attenuation characteristics, and measuring the light reflected through the liquid from portions of the object surface. By scanning the immersed object surface with a "pencil" of light, or by scanning an "electrical image" of the immersed object surface with an electron beam, an electrical signal can be generated which will represent a surface contour taken along any desired plane through the object.

Figure 1:
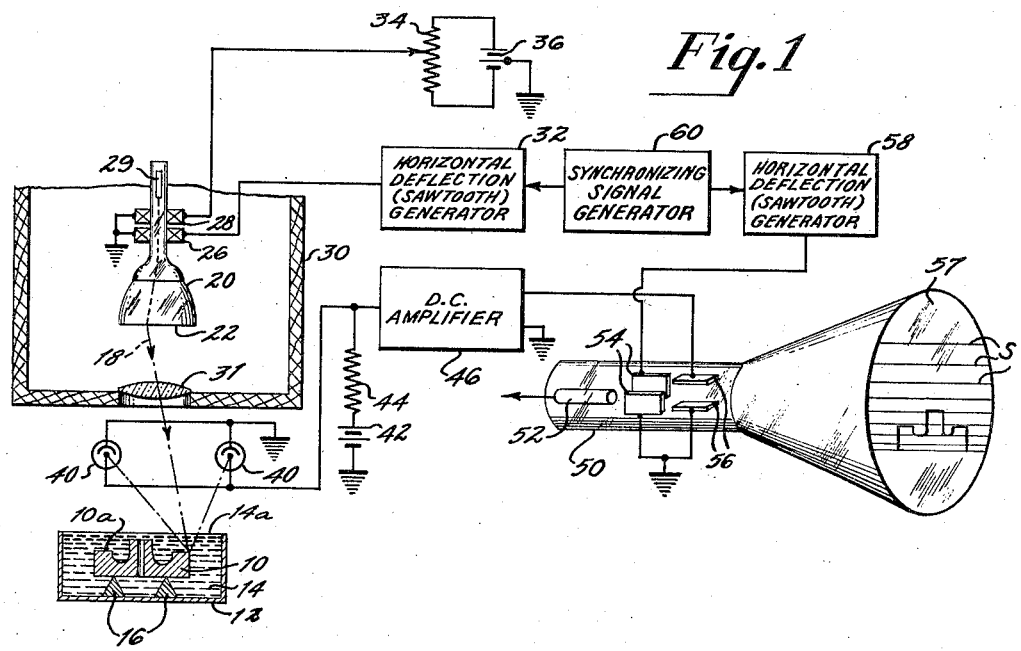
Figure 2:
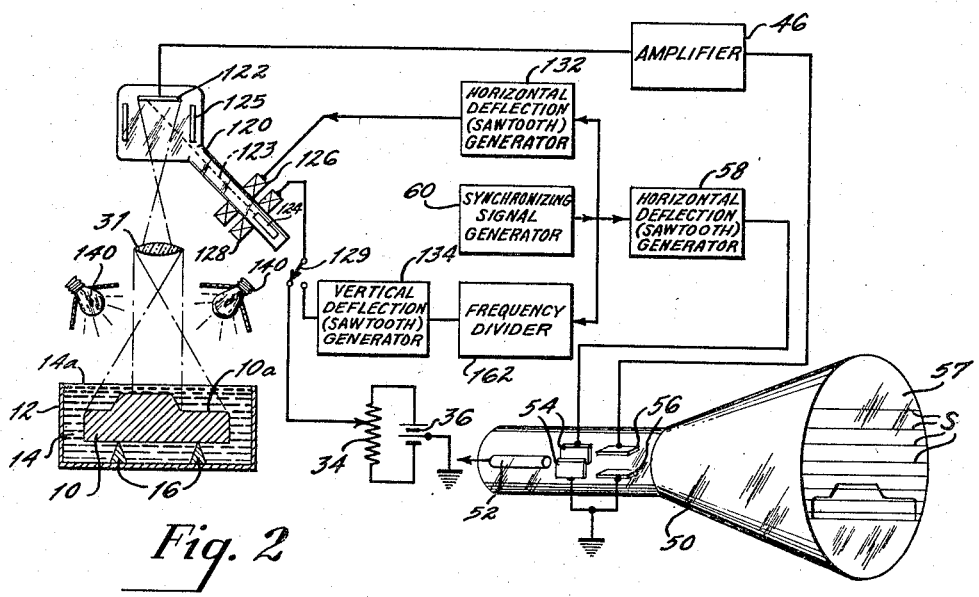

A more complete understanding of the invention can be had by reference to the following description of illustrative embodiments thereof, when considered in connection with the accompanying drawings wherein:

Fig. 1 shows schematically an apparatus for making contour measurements in accordance with the invention, Fig. 2 illustrates a modified form of the apparatus of Fig. 1.

It is well known that the intensity of a beam of light will always decrease to a greater or less extent when passed through matter in the solid, liquid, or gaseous state, unless the medium is perfectly transparent, and that the loss of intensity is due chiefly to absorption. In general, for a homogeneous absorbing medium, the intensity of the light beam will decrease exponentially as a function of the thickness and absorbing characteristics of the medium (see e. g. Fundamentals of Physical Optics, Jenkins and White, pp. 21–23). In accordance with my invention, these general principles are utilized in examining the surface of an object to determine the contour or profile thereof.

Referring to Fig. 1, there is shown in cross section a casting 10 which is to be compared with a model or pattern (not shown). The casting 10 is immersed in a bath of light-absorbing liquid 14 in an open tray 12 or other suitable container. The liquid 14 can be any liquid which will partially attenuate light rays passing therethrough, such as a colloidal dispersion of graphite in oil or water, for example. The surface 10a to be examined is preferably etched, or coated with a removable reflecting film such as white paint having a finely ground pigment, in order that the surface 10a will have substantially uniform light-reflecting characteristics. In the illustrative embodiment shown, the casting 10 is supported in the tray 12 on knife-edge blocks 16 or similar supports which will establish a reference plane through the casting parallel to the surface of the liquid 14.

In general, where thickness dimensions are to be measured, the bottom surface of the object will be taken as the reference plane as in the example shown, and the thickness dimensions will be obtained by measuring the distance between points on the surface of the object and the surface of the liquid. However, in some cases a profile will be of interest with relation to some reference plane other than the bottom surface of the object, and in such case the object will be suitably supported to orient the desired reference plane parallel to the surface of the liquid.

By illuminating the casting surface 10a with light passed through the liquid 14, and measuring the amount of light reflected from portions of the surface 10a along a preselected line, the contour or profile of the surface 10a along that line can be determined. For example, as shown in Fig. 1, the surface 10a of the casting 10 can be illuminated with a beam or pencil of light 18 generated at the fluorescent screen 22 of a cathode ray tube 20, and light reflected from the surface 10a of the casting can be picked up and measured by light sensitive elements such as two or more photoelectric tubes 40 disposed above the container 12.

The intensity of the reflected light reaching the phototubes 40 will be a function of the light absorbing properties of the liquid 14, and of the distance which the light has traveled through the liquid 14 in passing between the surface of the liquid and the surface 10a of the casting. Consequently, the amount of light picked up by the phototubes 40 will be a function of the distance that the light has traveled down and back through the liquid 14 for any given position of the beam 18, and, hence, will be a measure of the distance between the surface of the liquid 14 and the casting surface 10a for that particular beam position. By correlating the output of the phototubes 40 and the position of the beam 18, it is possible to obtain the profile of the casting 10 along the path followed by the beam 18.

Considering the apparatus of Fig. 1 in greater detail, the cathode ray tube 20 is provided with the usual electron gun 29, and with horizontal and vertical beam deflection coils 26, 28. It will be understood that the terms "horizontal" and "vertical," as used herein, have no absolute significance, but are used only to indicate orthogonal deflection of the cathode ray beam. For simplicity, the D. C. operating potentials for the tube 20, and the details of the gun 29, have been omitted.

The tube 20 is disposed in a housing 30 which has a lens 31 mounted in one wall thereof, facing the tube screen 22, to direct the light beam 18 onto the surface 10a. Although the container 12 is shown as being quite close to the housing 30 because of space limitations in the drawing, it will be understood that the container 12 and housing 30 should be spaced apart, or the optical system suitably designed, so that the light beam 18 will always enter the liquid 14 approximately at right angles to the surface thereof.

In order to cause the beam 18 to scan the surface 10a, the horizontal deflecting coil 26 of the cathode ray tube 20 is connected to a deflecting generator 32 which will supply a sawtooth waveshape current to the deflecting coil 26 to deflect the cathode ray repeatedly across the screen 22.

In the embodiment of the invention presently being described, the particular contour to be examined can be selected by adjusting the "vertical" position of the cathode ray beam with a potentiometer 34 connected across a battery 36. That is to say, a particular section through the casting 10 can be selected by adjusting the vertical position of the cathode ray beam (in a direction at right angles to the plane of the drawing).

The phototubes 40 are supplied with operating voltage from a battery 42 through a load resistor 44. The amount of current flow through the load resistor 44 will be a function of the amount of reflected light reaching the phototubes 40 from the casting surface 10a, and, hence, the load resistor voltage will be a function of the distance which the beam 18 will travel through the liquid 14 in any given beam position.

A preferred type of indicator for displaying the information obtained from the phototubes comprises a cathode ray display tube 50. The display tube 50 contains an electron gun 52 and horizontal and vertical beam deflection plates 54, 56, with the vertical plates being connected to the phototube load resistor 44, preferably through a D. C. amplifier 46, so that the vertical deflection voltage for the display tube 50 will be the profile information voltage obtained from the phototube circuit. The horizontal deflection voltage for the display tube 50 is obtained from a horizontal deflection generator 58, and comprises a sawtooth waveshape voltage timed to coincide with the sawtooth horizontal deflection current for the light beam generator tube 20. For example, the two sweep circuits 32, 58 can be coupled to a synchronizing signal generator 60 which will supply a signal to control or "trigger" both sweep circuits simultaneously.

As the cathode ray beams in the scanning and display tubes 20 and 50 move across the tube screens 22 and 57, respectively, the amount of reflected light picked up by the phototubes 40 will vary in accordance with the cross-sectional dimensions of the casting 10. The vertical deflection voltage for the display tube 50 will vary correspondingly, presenting a profile view of the casting 10 on the display screen 57.

In accordance with the general principles of light absorption, the amount of reflected light picked up by the phototubes 40 will vary exponentially as a function of the distance between the liquid surface 14a and the casting surface 10a. For this reason, the profile obtained on the screen 57 of the display tube 50 actually will be a logarithmic curve. Accordingly, the screen 57 of the display tube is preferably provided with logarithmically distributed scale lines S as an aid in interpretating the display.

In Fig. 2, there is shown an alternative apparatus for practicing the method of the present invention. In this case, a cathode ray "camera" tube, such as a so-called iconoscope, is utilized to convert an optical image of the immersed object into an electrical image, and the electrical image is scanned to obtain profile information.

In Fig. 2, the object 10 to be examined is immersed in a bath of light absorbing liquid 14 in a tray 12, as in the case of Fig. 1. The object surface 10a is subjected to uniform illumination with light from a plurality of shielded lamp bulbs 140 or the like, and an optical image of the illuminated surface 10a is focused by a lens 31 onto the mosaic screen 122 of a cathode ray camera tube 120 to form an electrical image on the screen 122. The liquid 14 has the same effect as the liquid 14 discussed above in connection with Fig. 1. The camera tube 120 also has the usual electron gun 124 and collector ring 125, and is provided with horizontal and vertical deflection coils 126, 128.

In accordance with the usual mode of operation of a camera tube of the type shown, the electrical image on the mosaic screen 122 will comprise a pattern of electric charges distributed in a pattern corresponding to the light distribution in the optical image focussed on the screen 122. By scanning the screen 122 with the electron beam 123, any charge deficiency at each point scanned will be eliminated, and the overall electrical potential of the screen 122 will assume a succession of different values depending on the charge supplied thereto at each instant. With the screen 122 coupled to the vertical deflection plates 56 of a cathode ray display tube 50, through an amplifier 46, a profile of the object 10 being examined can be reproduced on the display screen 57 as in the apparatus of Fig. 1.

The deflection system for the camera tube 120 is slightly modified as compared with the scanning system for the light beam generating tube 20 in Fig. 1. The vertical deflection voltage for the camera tube 120 can be obtained from a potentiometer 34 connected to a voltage source 36, as in the apparatus of Fig. 1, or the vertical deflection coil 128 of the camera tube 120 can be connected through a switch 129 to a vertical sweep generator 134 which will furnish a sawtooth waveshape current to the vertical deflection coil in order to produce a multi-line or "raster" type scan of the screen 122. The vertical sweep generator 134 is intended to furnish a sawtooth waveshape current at a submultiple of the operating frequency of the horizontal sweep generator 132. As shown, the vertical sweep generator 134 can be connected to the synchronization signal generator 60 through a frequency divider network 162, so that all three sweep generators 58, 132, 134 will be in step; the two horizontal generators 58, 132 operating at the same frequency, and the vertical generator 134 operating at a submultiple thereof.

The scanning system shown in Fig. 2 is particularly useful for checking dimensions of an object of uniform cross section in accordance with the method of the invention. If the profiles of the object are identical at each cross section scanned, a single, clear cut line will appear on the display tube screen 57, and the dimensions can be checked immediately. However, if any one or more of the profiles is slightly different than the others, the display screen presentation will be blurred or multi-line, depending on the amount of variation between profiles. In either event, if the profile display on the screen 57 shows one or more departures exceeding permissible tolerances, then the operator will know that the piece being examined is not acceptable, and can switch the vertical deflection coil 128 from the vertical sweep generator 134 to the vertical beam-position control potentiometer 34 to examine individual profiles of the object surface 10a, and determine the points of profile deviation.

It will be understood that either the single line scanning system or the multi-line scanning system, or both, can be used interchangeably in the apparatus of Figs. 1 and 2.

It should be noted that apparatus similar to that shown either in Fig. 1 or in Fig. 2 can be arranged for automatic or remote control operations. For example, in a rolling mill operation, a finished metal bar or rail could be run through a liquid bath beneath a cathode ray light beam source of the type shown in Fig. 1, or beneath a camera tube of the type shown in Fig. 2, and the output of the phototubes or of the camera tube, as the case may be, could be utilized to control the operation of the mill through a system of relays and the like, or to furnish a continuous picture of the cross-sectional profile of the metal sheet to an observer.

Furthermore, it is not necessary that the light reflected from the object surface be converted directly into electrical signals. For example, the object to be examined could be illuminated in the manner shown in Fig. 2, and a photograph taken of the immersed object surface. By scanning the resulting photographic transparency with a light beam, and picking up the light transmitted through the transparency, an electrical signal similar to that obtained in the apparatus of Fig. 1 would be made available.

Since these and other similar changes could be made in the apparatus shown for practicing the method of the present invention, the foregoing is to be construed as illustrative, and not in a limiting sense.

What is claimed is:

1. A method of measuring surface contours of an object each contour taken along a single plane having a uniform light-reflecting surface, said method comprising immersing said object in a light-absorbing liquid with a reference plane through said object oriented parallel to the surface of said liquid, directing light through said liquid onto said reflecting surface, and measuring the amount of light reflected through said liquid from a continuous series of aligned points on said reflecting surface as a measure of the distance between each said point and the surface of said liquid.

2. A method of measuring surface contours of an object each contour taken along a single plane having a uniform light-reflecting surface, said method comprising immersing said object in a light-absorbing liquid with a reference plane through said object oriented parallel to the surface of said liquid, directing light through said liquid onto said reflecting surface of said object, picking up light reflected through said liquid from points on said reflecting surface along a selected cross section of said object, and measuring the amount of reflected light picked up from each of said points as a measure of the distance between each said point and the surface of said liquid.

3. A method of measuring surface contours of an object each contour taken along a single plane having a uniform light-reflecting surface, said method comprising immersing the object to be examined in a light-absorbing liquid with a reference plane through said object oriented parallel to the surface of said liquid, scanning said reflecting surface of said immersed object along a single line with a beam of light, picking up light reflected through said liquid from said object surface, and measuring the amount of light picked up at each point along the path followed by said scanning beam as a measure of the distance between each said point and the surface of said liquid.

4. A method as set forth in claim 3 including the steps of converting said picked up light into an electrical signal the intensity of which is a function of the amount of light reflected from each said point, and deflecting an electron beam orthogonally with the deflection in one direction being synchronized with said light beam scanning and the deflection in another direction being controlled by said electrical signal so that the path followed by said electron beam will be a function of the contour of said reflecting surface along the path followed by said scanning beam.

5. A method of measuring a surface contour of a uniform light-reflecting surface of an object, said method comprising immersing said object in a light-absorbing liquid, uniformly illuminating said object surface through said liquid to form an optical image of said object surface as viewed through said liquid, converting said optical image into an electrical image consisting of an electrical charge pattern having charge deficiencies distributed in a pattern corresponding to the pattern of light distribution in said optical image, scanning said electrical image with a first electron beam, converting into an electrical signal changes caused by said beam in said charge pattern of said electrical image, and deflecting a second electron beam orthogonally with the deflection in one direction being synchronized with said first electron beam scanning and the deflection in another direction being controlled by said electrical signal so that the path followed by said electron beam will be a function of the contour of said reflecting surface along the path followed by said scanning beam.

6. Apparatus for measuring surface contours of an object having a uniform light reflecting surface each contour being taken along a single plane, comprising a bath of light absorbing liquid, means to immerse said object in said liquid bath with a reference plane through said object oriented parallel to the surface of said liquid, a light source, means directing light from said source through said liquid onto said reflecting surface, means including a light sensitive element positioned to intercept light reflected from said reflecting surface through said liquid, said means also including a cathode ray tube having a fluorescent screen, first beam deflecting means coupled to said light sensitive element to deflect the cathode ray beam in said tube in accordance with the amount of reflected light intercepted by said light sensitive element, and second beam deflection means to deflect said beam with uniform velocity in a direction at right angles to beam deflection effected by said first beam deflection means to measure the amount of light reflected through said liquid from adjacent points along said reflecting surface to determine the distance between the surface of said liquid and each point on said reflecting surface.

7. Apparatus for measuring surface contours of an object having a uniform light reflecting surface, said apparatus comprising a bath of light absorbing liquid, means to immerse said object in said liquid bath with a reference plane through said object oriented parallel to the surface of said liquid, a light source, means directing light from said source through said liquid onto said reflecting surface, and means to measure the amount of light reflected through said liquid from adjacent points on a straight line along said reflecting surface to determine the distance between the surface of said liquid and each point on said reflecting surface, said last named means comprising a signal generator positioned to intercept light reflected from said reflecting surface through said liquid, a cathode ray tube having a fluorescent screen, beam deflecting means coupled to said signal generator to deflect the cathode ray beam in said tube in one coordinate and second beam deflection means to deflect said beam with uniform velocity in a direction at right angles to beam deflection effected by said first named beam deflecting means.

8. Apparatus for measuring surface contours of an object having a uniform light reflecting surface, said apparatus comprising a bath of light absorbing liquid, means to immerse said object in said liquid bath with a reference plane through said object oriented parallel to the surface of said liquid, a light beam source comprising a first cathode ray tube having a fluorescent screen, means to direct a beam of light from said source through said liquid onto said reflecting surface, means to move said light beam across said reflecting surface along a predetermined scanning path, said last named means comprising a beam deflection system for deflecting the cathode ray beam in said tube orthogonally, and means to measure the amount of light reflected from points on said reflecting surface along the path followed by said light beam as a measure of the distance between each said point and the surface of said liquid, said measuring means including (1) a light sensitive element positioned to intercept light reflected from said reflecting surface and (2) a second cathode ray tube having a fluorescent screen, deflecting means coupling said light sensitive element to said second tube to deflect the cathode ray beam in said second tube in accordance with the amount of reflected light intercepted by said light sensitive element.

9. Apparatus for measuring surface contours of an object having a uniform light-reflecting surface, said apparatus comprising a bath of light-absorbing liquid, means to immerse said object in said liquid bath with a reference plane through said object oriented parallel to the surface of said liquid, light source means positioned to illuminate said reflecting surface uniformly through said liquid, a cathode ray camera tube having a mosaic screen adapted to convert optical images focussed thereon into electrical images, said tube being positioned to receive an optical image of said immersed object surface on said screen, a beam deflection circuit connected to said tube to control electron beam scanning therein whereby to alter the charge pattern in the electrical image on said screen, and means connected to said screen and responsive to changes in said charge pattern to measure the amount of light in said optical image from point to point along the scanning path followed by said electron beam in said tube as a measure of the distance between the surface of said liquid and points on said reflecting surface corresponding to said points in said electrical image.

10. Apparatus as defined in claim 9 wherein said measuring means comprises a cathode ray display tube having a fluorescent screen, and an orthogonal beam deflection system including a first deflection circuit synchronized with said camera tube deflection circuit to control electron beam scanning in said second tube and a second deflection circuit connected to said mosaic screen to deflect the second tube beam in accordance with said changes in said charge pattern.

PHILIP J. HERBST.

References Cited in the file of this patent

UNITED STATES PATENTS

| Number | Name | Date |
|--------|------|------|
| 294,052 | Leeds | Feb. 26, 1884 |
| 1,866,581 | Simjian | July 12, 1932 |
| 2,068,476 | Thomas | Jan. 19, 1937 |
| 2,075,808 | Fliess | Apr. 6, 1937 |
| 2,124,404 | Schroter | July 19, 1938 |
| 2,315,282 | Snow | Mar. 30, 1943 |
| 2,388,727 | Dench | Nov. 13, 1945 |
| 2,418,846 | Meacham | Apr. 15, 1947 |
| 2,429,066 | Kuehni | Oct. 14, 1947 |
| 2,433,971 | Adams | Jan. 6, 1948 |
| 2,437,608 | Long et al. | Mar. 9, 1948 |
| 2,467,812 | Clapp | Apr. 19, 1949 |